United States Patent
Danjo et al.

(10) Patent No.: US 11,297,127 B2
(45) Date of Patent: Apr. 5, 2022

(54) INFORMATION PROCESSING SYSTEM AND CONTROL METHOD OF INFORMATION PROCESSING SYSTEM

(71) Applicant: FUJITSU LIMITED, Kawasaki (JP)

(72) Inventors: Takumi Danjo, Kawasaki (JP); Takashi Arakawa, Numazu (JP); Masakatsu Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 252 days.

(21) Appl. No.: 16/670,165

(22) Filed: Oct. 31, 2019

(65) Prior Publication Data

US 2020/0195708 A1    Jun. 18, 2020

(30) Foreign Application Priority Data

Dec. 14, 2018 (JP) .............................. JP2018-234531

(51) Int. Cl.
*H04L 29/08* (2006.01)
*H04L 67/10* (2022.01)
*G06N 3/08* (2006.01)
*G06F 17/18* (2006.01)
*G06F 7/58* (2006.01)

(52) U.S. Cl.
CPC ............. *H04L 67/10* (2013.01); *G06F 17/18* (2013.01); *G06N 3/08* (2013.01); *G06F 7/588* (2013.01)

(58) Field of Classification Search
CPC ......... H04L 67/10; H04L 67/32; H04L 43/04; G06F 17/18; G06F 9/3001; G06F 7/588; G06N 3/08
See application file for complete search history.

(56) References Cited

U.S. PATENT DOCUMENTS

| 6,275,845 | B1 | 8/2001 | Tamura | |
|---|---|---|---|---|
| 2013/0232255 | A1* | 9/2013 | Fukui | H04W 4/38 709/224 |
| 2013/0290223 | A1* | 10/2013 | Chapelle | G06N 20/00 706/12 |
| 2017/0132515 | A1* | 5/2017 | Yokoi | G06N 3/0454 |

(Continued)

FOREIGN PATENT DOCUMENTS

| JP | 63-259767 | 10/1988 |
|---|---|---|
| JP | 04-114232 | 4/1992 |

(Continued)

*Primary Examiner* — Jungwon Chang
(74) *Attorney, Agent, or Firm* — Fujitsu Patent Center

(57) ABSTRACT

An information processing system includes: a first information processing device that transmits first data to be retained via a communication path; a second information processing device that calculates first calculation result data that is a calculation result of the first data received via the communication path and second data to be retained and transmits the calculated first calculation result data via the communication path; a third information processing device that transmits third data to be retained via the communication path; and a fourth information processing device that calculates second calculation result data that is a calculation result of the third data received via the communication path and fourth data to be retained and calculates third calculation result data that is a calculation result of the first calculation result data received via the communication path and the calculated second calculation result data.

6 Claims, 16 Drawing Sheets

(56) References Cited

U.S. PATENT DOCUMENTS

| | | | |
|---|---|---|---|
| 2018/0285168 A1* | 10/2018 | Kono | G06F 11/3433 |
| 2018/0322364 A1* | 11/2018 | Nagato | G06K 9/6202 |
| 2019/0102169 A1* | 4/2019 | Yamazaki | G06F 9/3885 |
| 2019/0188563 A1* | 6/2019 | Toda | G06F 17/18 |

FOREIGN PATENT DOCUMENTS

| | | |
|---|---|---|
| JP | 09-081530 | 3/1997 |
| JP | 11-134311 | 5/1999 |

* cited by examiner

INFORMATION PROCESSING SYSTEM AND CONTROL METHOD OF INFORMATION PROCESSING SYSTEM

CROSS-REFERENCE TO RELATED APPLICATION

This application is based upon and claims the benefit of priority of the prior Japanese Patent Application No. 2018-234531, filed on Dec. 14, 2018, the entire contents of which are incorporated herein by reference.

FIELD

The embodiment discussed herein is an information processing system and a method for controlling an information processing system.

BACKGROUND

In recent years, high performance computing (HPC), data science, machine learning, and deep learning (DL) have been actively adopted in various fields. These techniques involve a huge amount of calculations. Therefore, when these techniques are used, it is difficult to process data with a single processor. Therefore, the introduction of a parallel computer that increase the speed by dividing and allocating data to a large number of processors and calculating data in parallel has become popular. In a parallel computer, in order to perform data communication between processors, a processor and a memory are combined as a node, and the nodes are coupled by a network.

For example, when performing deep learning, a parallel computer is provided with a plurality of neuron layers. Forward processing which obtains an output from an input over each neuron layer, backward processing which obtains the difference by comparing the output and a correct answer, and update processing which updates the parameter used in each neuron layer by using the difference are repeatedly performed. Thereby, the parameter optimization for obtaining an appropriate value of the parameter used in each neuron layer is performed. The difference obtained by backward processing is sometimes referred to as gradient information when expressed by a differential coefficient or the like in image recognition or the like.

In parameter optimization, processing called Allreduce processing is performed in which differences acquired at each node by the backward processing are aggregated for each neuron layer, and update data is obtained by a predetermined operation and distributed to each node. As the Allreduce processing, for example, gradient information possessed by all nodes is added, and the added value is distributed to each node. Thereafter, the update data is obtained by dividing the added value by the number of nodes and taking an average at each node.

It is known that in deep learning, unlike HPC calculation using 32-bit or 64-bit floating point arithmetic, there is little difference in a final result even if the accuracy is somewhat low. Therefore, the model parameter is represented by a low bit integer to reduce the amount of data communication between nodes. For example, the latest graphics processing unit (GPU) supports 16-bit half-precision floating-point arithmetic and may achieve more than twice the throughput compared to 32-bit floating-point arithmetic. There is a technique for further improving the throughput by using a low-bit integer that is a fixed-point number.

As a technique for obtaining an average value in collective communication, there is a technique of the related art in which processors are grouped based on a communication performance level, a route processor in the group is determined for each communication performance level, and collection and spreading in a binary tree in the group are repeated. In parallel computing, there is a technique of the related art for obtaining an average value by broadcasting in the first half of processing and combining in the second half. In an arithmetic circuit that calculates a binary average value, there is a technique of the related art in which an integer is added and shifted in 2's complement expression and correction is performed by a two-stage exclusive OR circuit when an error occurs in the most significant digit. There is a technique of the related art for calculating an average value of binary input data, by inputting the result of the average value shifted right by adding data externally to lighten the calculation of the input data.

Examples of the related art include Japanese Laid-open Patent Publication No. 11-134311, Japanese Laid-open Patent Publication No. 9-81530, Japanese Laid-open Patent Publication No. 63-259767, and Japanese Laid-open Patent Publication No. 4-114232.

SUMMARY

According to an aspect of the embodiments, an information processing system includes: a first information processing device that transmits first data to be retained via a communication path; a second information processing device that calculates first calculation result data that is a calculation result of the first data received via the communication path and second data to be retained and transmits the calculated first calculation result data via the communication path; a third information processing device that transmits third data to be retained via the communication path; and a fourth information processing device that calculates second calculation result data that is a calculation result of the third data received via the communication path and fourth data to be retained and calculates third calculation result data that is a calculation result of the first calculation result data received via the communication path and the calculated second calculation result data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, for example, even if the gradient information is an 8-bit value in a configuration using four nodes, a 10-bit register may be used during the above-described Allreduce processing. In this case, computation in 16-bit representation is eventually performed, and the throughput is reduced by half. When the number of nodes increases and the number of nodes reaches 512, the sum may be 17 bits. In this case, since the operation is performed in 32-bit representation, the throughput is reduced to ¼.

Therefore, in order to suppress an overflow, a method of dividing the gradient information of each node in advance by the number of nodes before addition may be considered. However, in this method, the occurrence of an overflow is reduced, but when the number of nodes is large, the quotient becomes very small or becomes 0, and an error occurs at the time of addition, thereby degrading computational accuracy.

In the technique of the related art that performs collective communication by grouping processors based on the communication performance level, it is difficult to avoid an overflow and maintain computational accuracy in the Allreduce processing. It is difficult to apply the technique of the related art for obtaining an average value by combining broadcast and combination to the Allreduce processing, and it is difficult to avoid an overflow and maintain computational accuracy. When the value is incorrect in the most significant digit, Allreduce processing is not considered in the technique of the related art for correcting by a two-stage exclusive OR circuit and in the technique of the related art for inputting the result of the average value obtained by adding data externally and shifting the data in the average value calculation of the binary input data. Therefore, even if these techniques of the related art are used, it is difficult to avoid an overflow and maintain computational accuracy.

The disclosed technique has been made in view of the above, and an object thereof is to provide an information processing system and an information processing system control method that improve throughput without sacrificing calculation accuracy.

In one aspect, the present disclosure may improve throughput without sacrificing calculation accuracy.

Examples of an information processing system and a control method of the information processing system disclosed in the present application will be described below in detail with reference to drawings. The following examples do not limit the information processing system and the control method of the information processing system disclosed in the present application.

EXAMPLE 1

Figure 1:
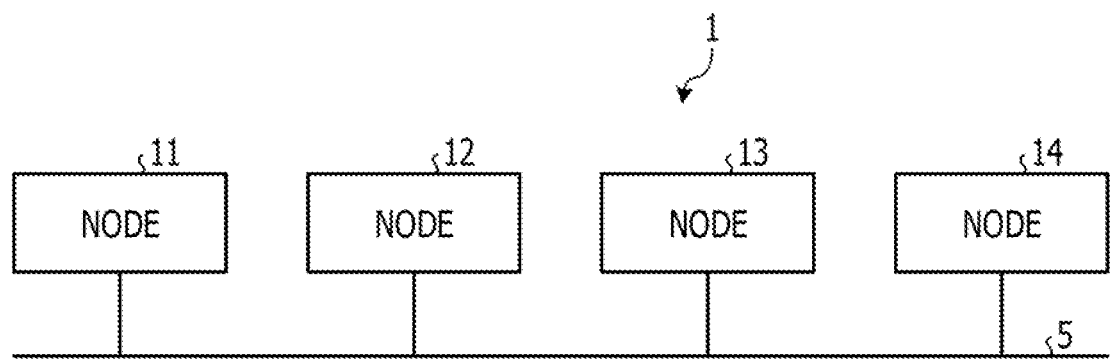
FIG. 1 is a diagram of an example of a parallel computer.

FIG. 1 is a diagram of an example of a parallel computer. A parallel computer 1 according to the present example includes nodes 11 to 14, for example. The nodes 11 to 14 are coupled to each other via a network 5. The nodes 11 to 14 may transmit and receive data to and from each other via the network 5. The nodes 11 to 14 correspond to an example of "first to fourth information processing devices". The network 5 corresponds to an example of "communication path".

For example, the nodes 11 to 14 execute deep learning. In deep learning, the nodes 11 to 14 perform parameter optimization. The nodes 11 to 14 calculate update data when optimizing the parameters. The nodes 11 to 14 each have gradient information, which is numerical data for calculating update data, at the time of calculating update data, and execute Allreduce processing using the gradient information of each node to obtain update data. In the following, when each of the nodes 11 to 14 is not distinguished, the nodes are called a node 10. Here, FIG. 1 illustrates the parallel computer 1 having four nodes 10 as an example, but the number of nodes 10 is not particularly limited.

Figure 2:
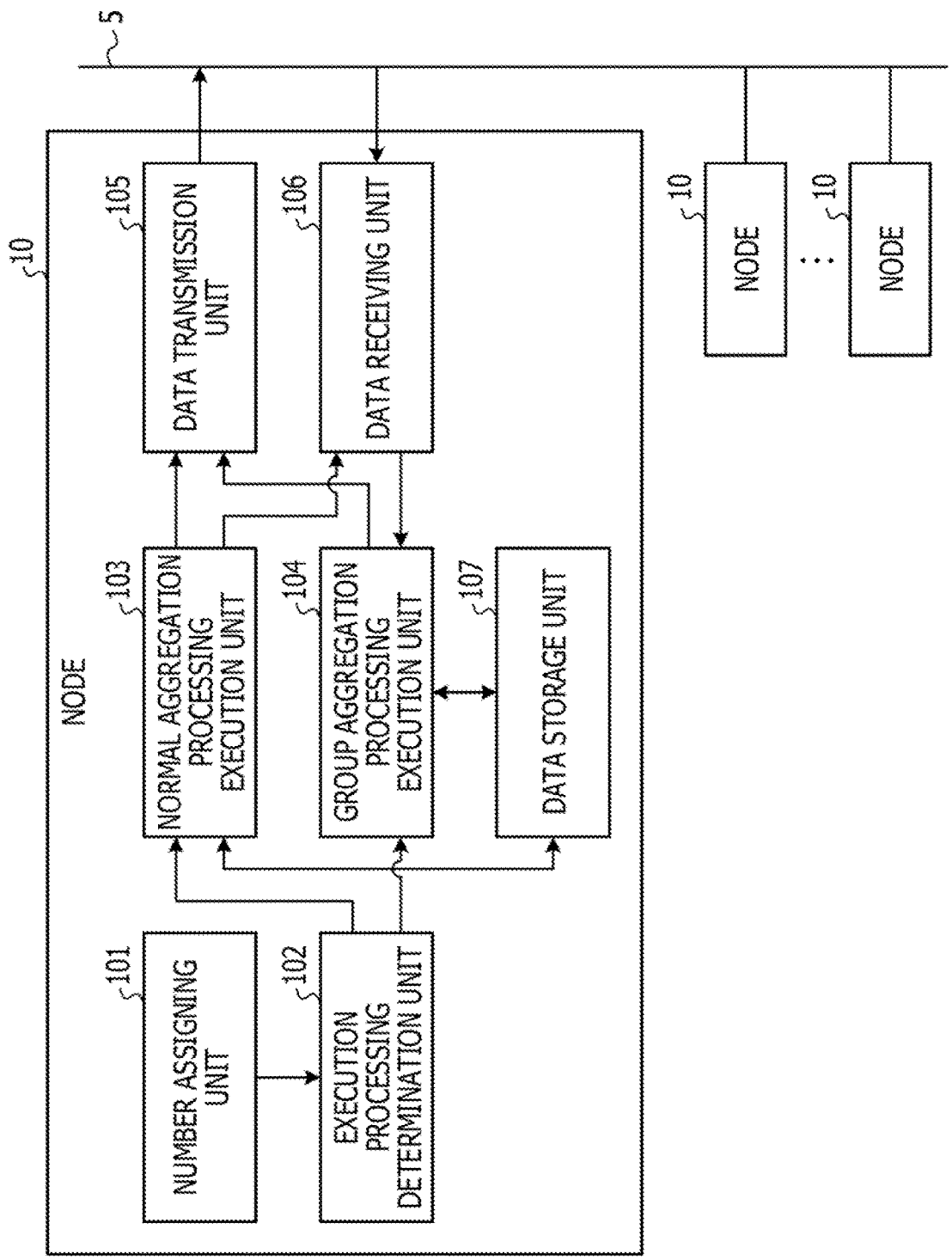
FIG. 2 is a block diagram of a node according to Example 1.

Next, the Allreduce processing performed by the node 10 will be described in detail with reference to FIG. 2. FIG. 2 is a block diagram of a node according to Example 1. A case where averaging is performed as an operation in the Allreduce processing will be described as an example. However, the operations in the Allreduce processing may be other operations, for example, addition, multiplication, acquisition of the maximum value, acquisition of the minimum value, and the like.

As illustrated in FIG. 2, the node 10 includes a number assigning unit 101, an execution processing determination unit 102, a normal aggregation processing execution unit 103, a group aggregation processing execution unit 104, a data transmission unit 105, a data receiving unit 106, and a data storage unit 107. Each node 10 executes various processing in the deep learning as described above, but FIG. 2 describes the function of performing the Allreduce processing, and other functions are omitted.

The data storage unit 107 stores gradient information. The data storage unit 107 stores calculation results and update data in the middle of calculating update data.

Figure 3:
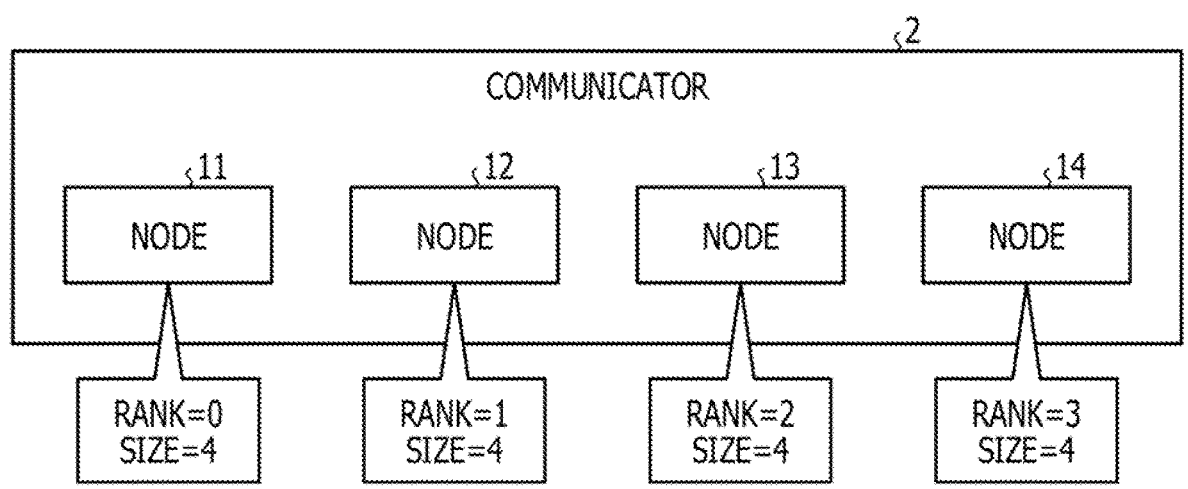
FIG. 3 is a diagram illustrating MPI processing by a number assigning unit.

The number assigning unit 101 uses a message passing interface (MPI) function to generate a communicator 2 that is a group of process groups that may communicate with each other as illustrated in FIG. 3. FIG. 3 is a diagram illustrating MPI processing by the number assigning unit. Since each node 10 executes a process, the communicator 2 may be considered as a group of nodes 10 as illustrated in FIG. 2. Each node 10 included in the communicator 2 holds information on the communicator 2. In the present example, a case where one node 10 executes one process will be described as an example.

Next, the number assigning unit 101 executes the MPI function to acquire the number of processes belonging to the communicator 2, that is, the size that is the number of nodes 10 in the present example. In the present example, since the nodes 11 to 14 are included in the communicator 2, the number assigning unit 101 acquires 4 as the size. The number assigning unit 101 executes the MPI function to set a rank that is an identification number for each process belonging to the communicator 2. The rank is assigned a value obtained by subtracting 1 from the number of all processes belonging to the communicator 2 in order from 0. In the present example, since each node 10 executes one process, it may be said that a rank is assigned to each node 10. The number assigning unit 101 sets the rank of the node 11 to 0, sets the rank of the node 12 to 1, sets the rank of the node 13 to 2, and sets the rank of the node 14 to 3. Thereafter, the number assigning unit 101 outputs the size and rank information assigned to each node 10 to the execution processing determination unit 102.

Returning to FIG. 2, the description will be continued. The execution processing determination unit 102 receives from the number assigning unit 101 the input of the size of the communicator 2 and the rank information assigned to each node 10. Next, the execution processing determination unit 102 determines whether or not the number of targets of the Allreduce processing is a power of 2. The number of targets of the Allreduce processing is the total number of processes executed by the nodes 10 belonging to the communicator 2. In the present example, each node 10 executes one process, and the number of targets of Allreduce processing is the number of nodes 10 included in the communicator 2, which matches the size of the communicator 2.

When the number of nodes 10 is not a power of 2, the execution processing determination unit 102 determines to execute normal all-node averaging processing. Normal all-node averaging processing is processing in which the gradient information of all the nodes 10 is collected in one node 10 to obtain the sum of the gradient information, the sum is distributed to each node 10, and each node 10 obtains an average value by dividing the sum of gradient information by the number of nodes 10. In this case, the execution processing determination unit 102 instructs the normal aggregation processing execution unit 103 to execute the Allreduce processing. The execution processing determination unit 102 transmits the size information and the rank information of each node 10 to the normal aggregation processing execution unit 103.

On the other hand, when the number of nodes 10 is a power of 2, the execution processing determination unit 102 determines to execute all-node averaging processing using a two-group average. Since there are four nodes 11 to 14, the number of nodes 10 is a power of 2, and the execution processing determination unit 102 determines to execute the all-node averaging processing using the two-group average. The all-node averaging processing using the two-group average is processing of grouping two nodes 10 each retaining the gradient information or the calculation result using the gradient information and repeating the calculation of an average value of the values of two nodes in a group. In the present example, since there are four nodes 11 to 14, the number of nodes 10 is a power of 2, and the execution processing determination unit 102 determines to execute the all-node averaging processing using the two-group average. The all-node averaging processing using the two-group average will be described in detail later. In this case, the execution processing determination unit 102 instructs the group aggregation processing execution unit 104 to execute the Allreduce processing. The execution processing determination unit 102 transmits the size information and the rank information of each node 10 to the normal aggregation processing execution unit 103.

If the number of nodes 10 is not a power of 2, the normal aggregation processing execution unit 103 receives an instruction to execute the Allreduce processing from the execution processing determination unit 102. Then, the normal aggregation processing execution unit 103 determines an aggregation node that aggregates gradient information among the nodes 10 belonging to the communicator 2 based on the rank.

If the own device is not an aggregation node, the data transmission unit 105 is caused to transmit the gradient information stored in the data storage unit 107 to the aggregation node. Thereafter, the normal aggregation processing execution unit 103 receives an input of the sum total of gradient coefficients from the data receiving unit 106. The normal aggregation processing execution unit 103 calculates an average value by dividing the sum of the gradient coefficients by the size and stores the calculated average value in the data storage unit 107.

When the own device is an aggregation node, the normal aggregation processing execution unit 103 receives an input of gradient information sent from another node 10 from the data receiving unit 106. The normal aggregation processing execution unit 103 obtains the sum of the gradient information and causes the data transmission unit 105 to transmit the obtained sum to each node 10. Thereafter, the normal aggregation processing execution unit 103 calculates the average value by dividing the sum of the gradient coefficients by the size and stores the calculated average value in the data storage unit 107.

When the number of nodes 10 is a power of 2, the group aggregation processing execution unit 104 receives an instruction to execute the Allreduce processing from the execution processing determination unit 102. The group aggregation processing execution unit 104 initializes i representing the number of repetitions and sets i=0. The group aggregation processing execution unit 104 sets j as an integer greater than or equal to 0 and sets nodes 10 having ranks of 2j and 2j+1 as a group. That is, if the rank of the own device is 2j, the group aggregation processing execution unit 104 determines that the node 10 having a rank of 2j+1 and the own device are grouped. If the rank of the own device is 2j+1, the group aggregation processing execution unit 104 determines that the node 10 having a rank of 2j and the own device are grouped. The group aggregation processing execution unit 104 of the node 10 having a rank of 2j+1 transmits the gradient information stored in the data storage unit 107 to the node 10 having a rank of 2j set as a group.

On the other hand, the group aggregation processing execution unit 104 of the node 10 having a rank of 2j receives the gradient information from the node 10 having a rank of 2j+1 set as a group. Next, the group aggregation processing execution unit 104 calculates an average value of the gradient information stored in the data storage unit 107 of the own device and the received gradient information. The group aggregation processing execution unit 104 stores the calculation result in the data storage unit 107.

Next, the group aggregation processing execution unit 104 increments i by 1 and determines whether i has reached n when the size is expressed as 2 to the nth power. If i has not reached n, the group aggregation processing execution unit 104 assigns a number from 0 to the node 10 for which the average value of the gradient information has been calculated, that is, the node 10 having a rank of 2j, in order from the lowest rank. The group aggregation processing execution unit 104 sets j as an integer equal to or greater than 0 and sets the nodes 10 having the assignment numbers 2j and 2j+1 as a group.

The group aggregation processing execution unit 104 of the node 10 having the assignment number 2j receives the calculation result from the node 10 having the assignment number 2j+1. Next, the group aggregation processing execution unit 104 calculates an average value of the calculation result stored in the data storage unit 107 of the own device and the received calculation result. The group aggregation processing execution unit 104 stores the calculation result in the data storage unit 107.

Hereinafter, until i reaches n, the group aggregation processing execution unit 104 repeats number assignment, data transmission from the node 10 having the assignment number 2j to the node having the assignment number 2j+1, and calculation of the average value of the calculation results.

When i reaches n, since there is no average value calculation result other than the node 10 of the own device, the group aggregation processing execution unit 104 determines that the calculation result stored in the data storage unit 107 of the node 10 of the own device is an average value of all gradient information. The group aggregation processing execution unit 104 instructs the data transmission unit 105 to transmit the average value of all the gradient information stored in the data storage unit 107 to each node 10. As described above, i is the number of repetitions of the averaging processing of the two nodes 10 already performed, and if the number of repetitions reaches a multiplier when the size is expressed as a power of 2, the average value of the gradient information possessed by all the nodes 10 is obtained.

Figure 4:
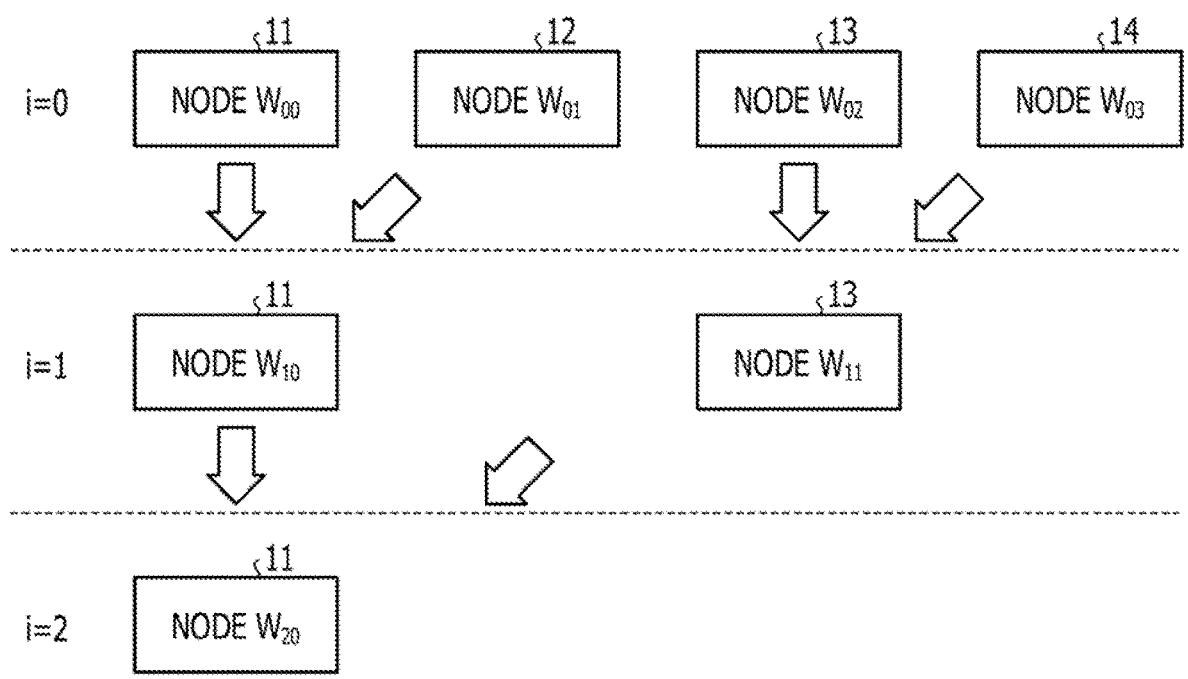
FIG. 4 is a diagram illustrating an example of aggregation processing of gradient information according to Example 1.

With reference to FIG. 4, the flow of the gradient information aggregation processing when the nodes 11 to 14 according to the present example are used will be described. FIG. 4 is a diagram illustrating an example of gradient information aggregation processing according to Example 1. i and the rank or assigned number of each node 10 are arranged as a subscript of W to represent each node 11 to 14 in each stage. When expressed as node $W_{ij}$, in an i-th (i is an integer greater than or equal to 0) averaging processing of the two nodes 10, a j-th (j is greater than or equal to 0) node 10 from the lowest rank number of the nodes 10 having the calculation result is represented. In FIG. 4, in the averaging processing of the two nodes 10, the node 10 that has transmitted the gradient information to the other nodes 10 is excluded.

As illustrated in FIG. 4, in an averaging processing of the two nodes 10 at i=0, the nodes 11 to 14 are represented as a node $W_{00}$, a node $W_{01}$, a node $W_{02}$, and a node $W_{03}$. Since the node 11 has a rank of 0=2j (j=0), the node 11 is grouped with the node 12 having a rank of 1=2j+1 (j=0). Since the rank of the node 13 is 2=2j (j=1), the node 13 is grouped with the node 14 having a rank of 1=2j+1 (j=1).

The gradient information of the node 12 is transmitted to the node 11. The node 11 calculates an average value of the gradient information of the node 11 and the gradient information of the node 12. The gradient information of the node 14 is transmitted to the node 13. The node 13 calculates an average value of the gradient information of the node 13 and the gradient information of the node 14.

in an averaging processing of the two nodes 10 at i=1, the node 11 is represented as a node $W_{10}$, and the node 13 is represented as a node $W_{11}$. Since the node 11 has an assignment number of 0=2j (j=0) and the node 14 has an assignment number of 1=2j+1 (j=0), the node 13 is the sending side of the calculation result.

Therefore, the node 13 transmits the calculation result to be held to the node 11. The node 11 calculates an average value of the calculation result held by the node 11 and the calculation result held by the node 12.

In an averaging processing of the two nodes 10 at i=2, the node 11 is represented as a node $W_{20}$. The size of the communicator 2 according to the present example is 4, and at this time, i reaches a multiplier when the size of the communicator 2 is expressed by a power of 2. Therefore, the node 11 determines completion of the all-node averaging processing using the two-group average.

The gradient information of the node 11 corresponds to an example of "first data". The gradient information of the node 12 corresponds to an example of "second data". The gradient information of the node 13 is an example of "third data". The gradient information of the node 14 is an example of "fourth data". The average value of the gradient information held by the node 11 calculated by the node 12 and the gradient information held by the node 12 corresponds to an example of "first calculation result data". The average value of the gradient information held by the node 13 calculated by the node 14 and the gradient information held by the node 14 is an example of "second calculation result data". Furthermore, the average value of the gradient information by the node 12 and the average value of the gradient information by the node 14 calculated by the node 14 is an example of "third calculation result".

Returning to FIG. 2, the description will be continued. The data transmission unit 105 receives a data transmission instruction from the normal aggregation processing execution unit 103 or the group aggregation processing execution unit 104. The data transmission unit 105 transmits specified data to the destination node 10 specified by the instruction.

The data receiving unit 106 receives a calculation result input from another node 10. Then, the data receiving unit 106 outputs the received data to the normal aggregation processing execution unit 103 or the group aggregation processing execution unit 104 that is the destination.

As described above, in order for the group aggregation processing execution unit 104 according to the present example to perform the averaging processing of the two nodes 10, it is preferable to satisfy the following three conditions. A first condition is that the number of targets of the Allreduce processing is a power of 2. A second condition is that the value to be averaged is 2's complement representation or unsigned. A third condition is that the calculation order constitutes a binary tree.

Figure 5:
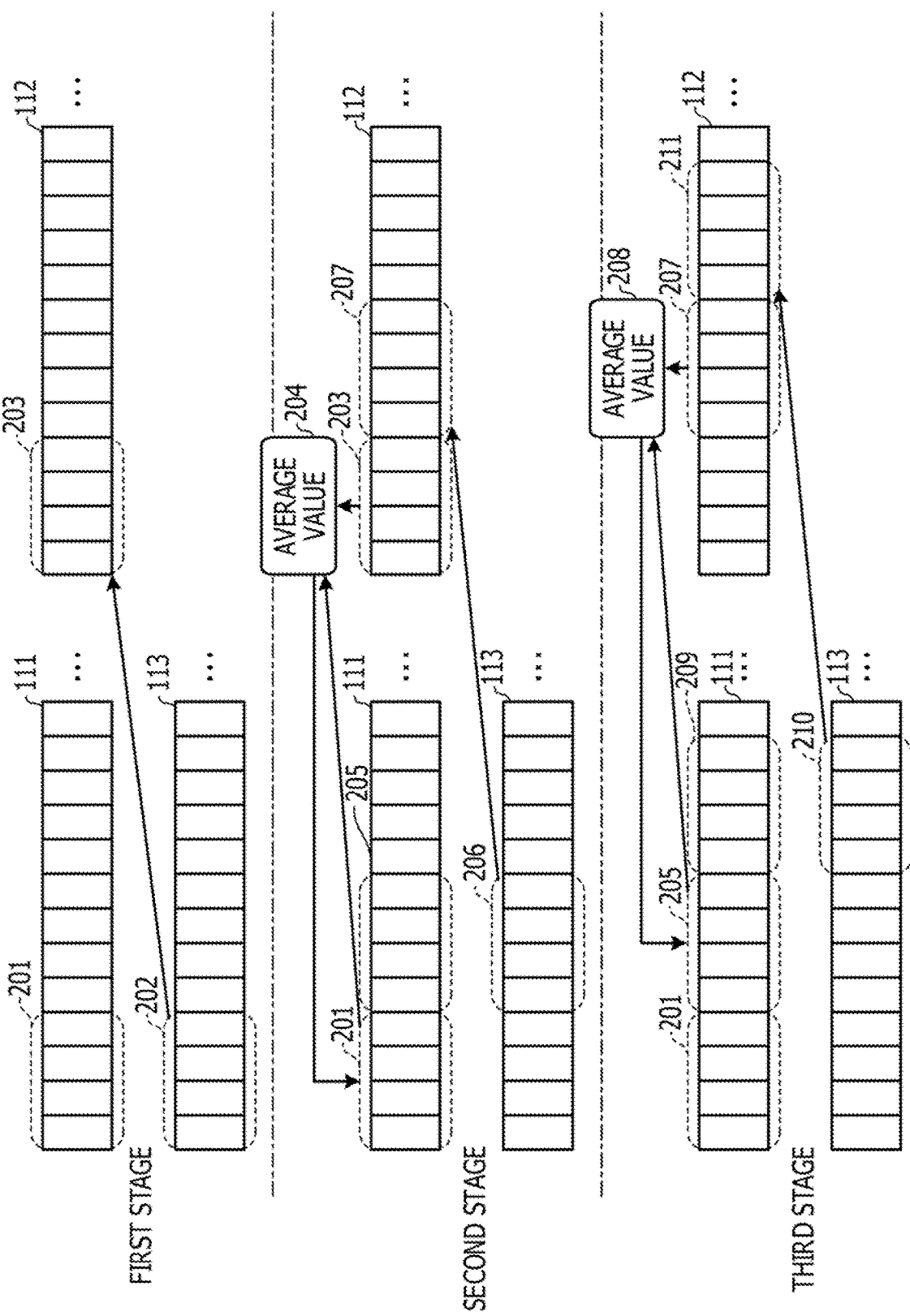
FIG. 5 is a diagram illustrating pipeline processing of averaging processing.

The group aggregation processing execution unit 104 according to the present example pipelines the execution of the averaging processing using the gradient information and calculation result of the own device to speed up the execution of all-node averaging using two-group average, Therefore, with reference to FIG. 5, the pipelining of the averaging processing in the group aggregation processing execution unit 104 will be described. FIG. 5 is a diagram illustrating the pipelining of the averaging processing. A case where the node 11 receives gradient information from the node 12 and calculates an average value will be described.

In FIG. 5, a buffer 111 is a storage area for storing received data and calculation results that the data storage unit 107 of the node 11 has. The buffer 112 is a temporary storage area for received data that the data storage unit 107 of the node 11 has. The buffer 113 is a storage area for data to be transmitted that the data storage unit 107 of the node 12 has. That is, the array data stored in the buffer 111 corresponds to the gradient information that the node 11 has. The array data stored in the buffer 113 corresponds to the gradient information that the node 12 has. When the average value of the gradient information of the node 11 and the node 12 is obtained, the node 12 transmits partial data of the array data to the node 11. The node 11 obtains the average value of the entire array data by repeating the calculation of the average value with the partial data of the array data that the node 11 has corresponding to the partial data of the received array data.

In a first stage, the node 11 receives the partial data stored in the area 202 of the buffer 113 and stores the partial data in an area 203 of the buffer 112.

In a next second stage, the node 11 calculates an average value 204 of the partial data stored in an area 201 of the buffer 111 and the partial data stored in the area 203 of the buffer 112 and stores an average value 204 in the area 201 of the buffer 111. In parallel with this processing, the node 11 receives the partial data stored in an area 206 of the buffer 113 and stores the partial data in an area 207 of the buffer 112.

In a next third stage, the node 11 calculates an average value 208 of the partial data stored in an area 205 of the buffer 111 and the partial data stored in the area 207 of the buffer 112 and stores the average value 208 in the area 205 of the buffer 111. In parallel with this processing, the node 11 receives the partial data stored in an area 210 of the buffer 113 and stores the partial data in an area 211 of the buffer 112.

Thereafter, the node 11 repeats the averaging processing of the partial data in the array data that is the gradient information in parallel and completes the calculation of the average value of the entire array data. In this way, by repeating the averaging processing of the partial data in the array data that is the gradient information by pipelining, the group aggregation processing execution unit 104 may execute the all-node averaging processing using the two-group average at high speed.

Figure 6:
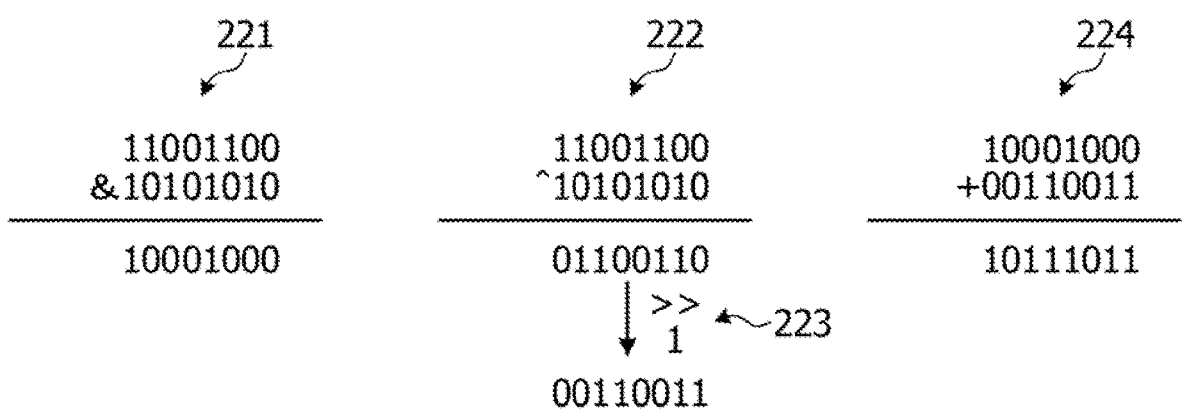
FIG. 6 is a diagram illustrating a method of calculating an average value of retained data of two nodes.

When the group aggregation processing execution unit 104 calculates the average value of the values held by the two nodes 10, the occurrence of an overflow is avoided by executing the following calculation. Hereinafter, with reference to FIG. 6, the calculation of the average value of the values held by the two nodes 10 by the group aggregation processing execution unit 104 will be described. FIG. 6 is a diagram illustrating a method for calculating an average value of data held in two nodes.

When the value of the reception-side node 10 is x0 and the value of the transmission-side node 10 is x1, the group aggregation processing execution unit 104 calculates a first value by calculating the logical product of x0 and x1. The group aggregation processing execution unit 104 obtains an exclusive OR of x0 and x1 and performs a 1-bit right shift to calculate a second value. In the 1-bit right shift, the group aggregation processing execution unit 104 adds 0 to the first bit in the shifted value. The 1-bit right shift corresponds to division by 2. The group aggregation processing execution unit 104 calculates the average value of x0 and x1 by adding the first value and the second value.

That is, when the logical product is represented by "&", the exclusive OR is represented by "^", and the 1-bit right shift calculation is expressed by ">>1", the group aggregation processing execution unit 104 obtains an average value of x0 and x1 by executing the calculation expressed as (x0 & x1)+((x0^x1)>>1). This calculation method is a method in which an average value is calculated for each bit and added later, and is a rounding-down method using rounding to negative infinity.

When the bit values are the same between x0 and x1, the average value is obtained according to the following principle. First, bits having the same bit value are extracted by x0 & x1. In this case, since the bit values are the same, x0 & x1 is the average value as it is. On the other hand, when the bit values are different between x0 and x1, the average value is obtained by the following principle. First, bits having different bit values are extracted by x0^x1. Since the bit values are different, the calculation of dividing by 2 is converted into a shift operation (x0^x1)>>1, thereby obtaining an average value of bits having different bit values.

For example, a specific example will be described in the case of x0=11001100 and x1=10101010. In this case, if x0 and x1 are simply added and divided by 2, a carry occurs during the addition, and an overflow from the 8-bit data area occurs.

On the other hand, the group aggregation processing execution unit 104 according to the present example calculates a logical product of x0 and x1 by an calculation 221. In this case, the group aggregation processing execution unit 104 acquires 10001000 as the first value that is the result of the calculation 221. In the calculation 221, no overflow occurs.

The group aggregation processing execution unit 104 obtains an exclusive OR of x0 and x1 by a calculation 222 and performs a 1-bit right shift by a calculation 223. In this case, the group aggregation processing execution unit 104 acquires 01100110 as the second value that is the result of the calculation 222. The overflow does not occur even in the calculation 222.

The group aggregation processing execution unit 104 calculates an addition value of the first value and the second value by a calculation 224. Thereby, the group aggregation processing execution unit 104 obtains 101111011 as the calculation result. In this case, since the most significant digit of the second value is 0, no overflow occurs due to the addition. The value calculated here coincides with the average value of x0 and x1 calculated by simply adding 0 and x1 and dividing by 2. That is, the group aggregation processing execution unit 104 may calculate the average value of x0 and x1 by this calculation. In this way, the group aggregation processing execution unit 104 may calculate the average value of x0 and x1 without causing an overflow.

Figure 7:
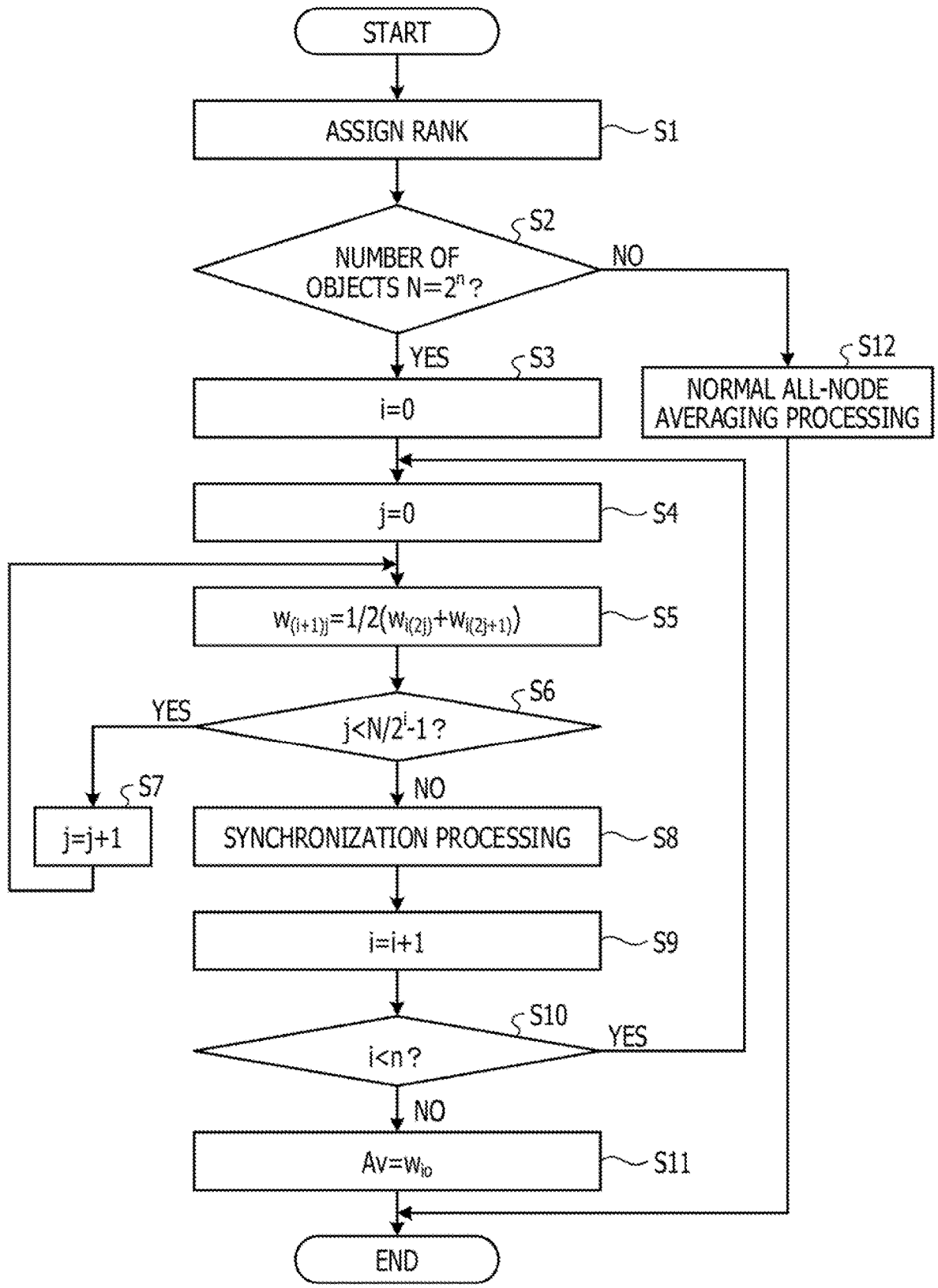
FIG. 7 is a flowchart of Allreduce processing by the parallel computer according to Example 1.

Next, with reference to FIG. 7, the flow of Allreduce processing by the parallel computer according to the present example will be described. FIG. 7 is a flowchart of Allreduce processing by the parallel computer according to Example 1. Hereinafter, the gradient information and the calculation result held by the node 10 may be collectively referred to as "held data".

The number assigning unit 101 generates a communicator 2 and assigns a rank to each node 10 belonging to the size of the generated communicator 2 and the communicator 2 (step S1). Thereafter, the number assigning unit 101 outputs the size information and rank information of the communicator 2 to the execution processing determination unit 102.

The execution processing determination unit 102 receives input of the size information and rank information of the communicator 2 from the number assigning unit 101. The execution processing determination unit 102 sets the size of the communicator 2 to the number of objects that is the number of nodes 10 to be the targets of the Allreduce processing. The number of objects is N. Then, the execution processing determination unit 102 determines whether the number of objects N may be expressed as 2 to the n-th power, that is, $N=2^n$ (step S2).

If the target number N may be expressed as 2 to the n-th power (step S2: Yes), the execution processing determination unit 102 requests the group aggregation processing execution unit 104 to execute the Allreduce processing. In response to the request to execute the Allreduce processing, the group aggregation processing execution unit 104 initializes i to 0 (step S3).

Next, the group aggregation processing execution unit 104 initializes j to 0 (step S4).

Next, the group aggregation processing execution unit 104 assigns numbers in order from 0 to a serial number as an assignment number from the lower rank side of the node 10 that has not transmitted the retained data to the other nodes 14. The group aggregation processing execution unit 104 of the node 10 of which assignment number is represented as 2j+1 transmits the data held by the own device to the node 10 of which assignment number is represented as 2j. On the other hand, the node 10 of which assignment number is represented as 2j calculates the average value of the retained data of the own device and the received retained data. In an i-th averaging processing of the two nodes 10, the retained data of the node 10 of which assignment number is represented as 2j is $w_{i(2j)}$, and the retained data of the node 10 of which assignment number is represented as 2j+1 is $w_{i(2j+1)}$. In the (i+1)th averaging processing of the two nodes 10, the retained data of a j-th node 10 from the lower rank side is represented as $w_{(i+1)j}$. In this case, the node 10 of which assignment number is represented as 2j in the i-th processing becomes the j-th node 10 in the (i+1)th processing, and the group aggregation processing execution unit 104 performs a calculation expressed as $W_{(i+1)j} = \frac{1}{2}(w_{i(2j)} + w_{i(2j+1)})$ (step S5).

The group aggregation processing execution unit 104 determines whether j has reached a multiplier when N is expressed as a power of 2, that is, $j < N/2^i - 1$ (step S6). If $j < N/2^i - 1$ (step S6: Yes), the group aggregation processing execution unit 104 increments j by 1 (step S7) and returns to step S5.

On the other hand, if $j < N/2^i - 1$ is not satisfied (step S6: No), the group aggregation processing execution unit 104 executes synchronization processing (step S8). The synchronization processing is processing of waiting until the averaging processing is completed in all the i-th nodes 10 of which assignment numbers are 2j.

Next, the group aggregation processing execution unit 104 increments i by one (step S9).

Next, the group aggregation processing execution unit 104 determines whether i has reached a multiplier when the size of the communicator 2 is expressed as a power of 2, that is, whether $i < n$ (step S10). If $i < n$ (step S10: Yes), the group aggregation processing execution unit 104 returns to step S4.

On the other hand, when $i < n$ is not satisfied (step S10 No), the group aggregation processing execution unit 104 determines that Av, which is an average value of the gradient information of all the nodes 10, is $W_{i0}$ (step S11).

On the other hand, when the target number N may not be expressed as 2 to the n-th power (step S2: No), the execution processing determination unit 102 requests the normal aggregation processing execution unit 103 to execute the Allreduce processing. In response to the request to execute the Allreduce processing, the normal aggregation processing execution unit 103 executes i normal all-node averaging processing (step S12).

As described above, the parallel computer according to the present example executes the Allreduce processing for all nodes by repeating the calculation of the Allreduce processing in which two nodes are grouped. As a result, the parallel computer according to the present example may reduce calculation errors and suppress the data transfer amount and may improve the throughput without sacrificing the calculation accuracy.

The parallel computer according to the present example performs averaging processing on all nodes without causing an overflow by obtaining an average value of two values by calculation using a logical product and an exclusive OR.

The averaging calculation is completed in a very short time compared to the inter-node communication and the data reading and writing processing from the buffer. The parallel computer according to the present example may conceal the processing time by overlapping the data communication in the averaging processing and the processing of reading and writing the data from the buffer. Thereby, the parallel computer according to the present example may suppress performance degradation due to an increase in the number of times of averaging processing.

MODIFICATION EXAMPLE 1

Figure 8:
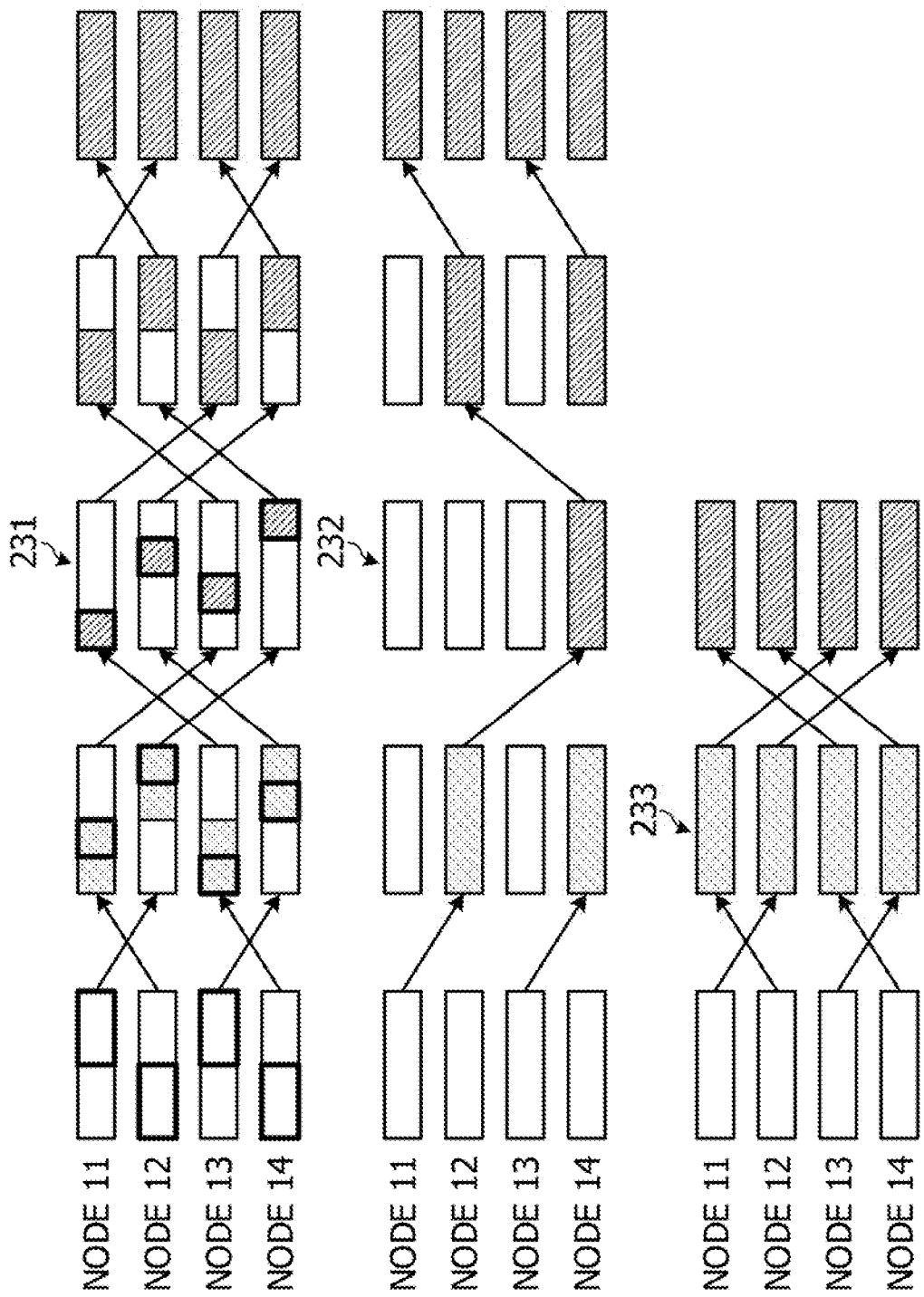
FIG. 8 is a diagram illustrating another method of Allreduce processing for every two nodes.

In Example 1, each node 10 assigns assignment numbers in order from the lowest rank, and executes the Allreduce processing for each of the two nodes 10 with the nodes 10 having adjacent assignment numbers adjacent to each other. However, the method of Allreduce processing for every two nodes 10 is not limited thereto. Therefore, the Allreduce processing for each of the two nodes 10 by another method will be described below. FIG. 8 is a diagram illustrating another method of Allreduce processing for every two nodes.

An aggregation procedure 231 illustrated in FIG. 8 may be called a division butterfly method. In addition, the aggregation procedure 232 may be referred to as a binary tree aggregation method. An aggregation procedure 233 may be referred to as a total amount butterfly method.

In the aggregation procedure 231, adjacent nodes 11 to 14 each exchange partial data that is half of the array data. Each of the nodes 11 to 14 performs calculation by using the received data and the corresponding partial data. Next, each of the nodes 11 to 14 exchanges half of the partial data of the calculation result with the counterpart having the calculation result at the same position of the array data. Each of the nodes 11 to 14 performs calculation by using the received data and the corresponding partial data. Thereafter, by distributing the calculation results of the nodes 11 to 14 to each other, the nodes 11 to 14 may acquire the calculation results using all the gradient information.

In the aggregation procedure 232, the node 11 transmits the array data to the node 12, and the node 13 transmits the array data to the node 14. Next, the nodes 12 and 14 perform a calculation by using the received array data. Next, the node 12 transmits the calculation result to the node 14. The node 14 performs a calculation by using each calculation result. Thereafter, the calculation result of node 14 is distributed to the nodes 11 to 13. As a result, the nodes 11 to 14 may obtain the calculation results using all the gradient information.

In the aggregation procedure 233, the adjacent nodes 11 to 14 each exchange partial data of half of the array data, and each performs a calculation. Next, nodes 11 to 14 having other calculation results exchange the calculation results, and each executes the calculation. As a result, the nodes 11 to 14 may obtain the calculation results using all the gradient information.

Figure 9:
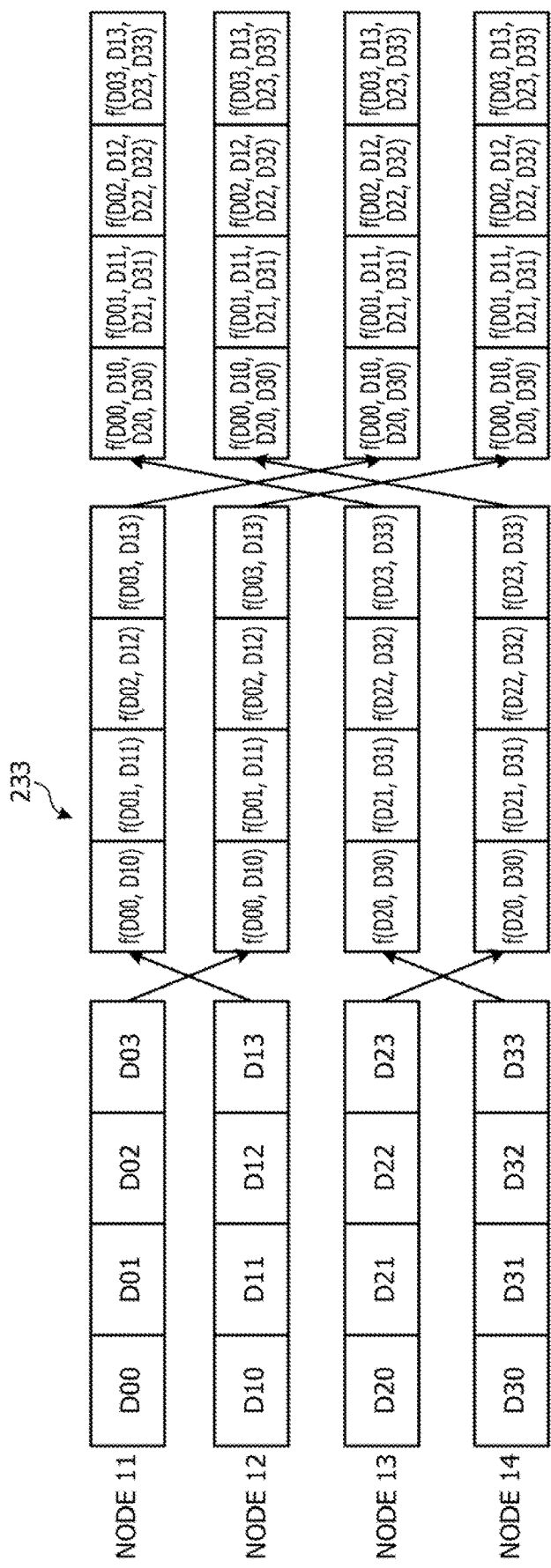
FIG. 9 is a diagram illustrating a specific example of Allreduce processing using a total amount butterfly method.

With reference to FIG. 9, a specific example of the Allreduce processing by the total amount butterfly method will be described. FIG. 9 is a diagram illustrating a specific example of the Allreduce processing by the total amount butterfly method. Here, the node 11 has array data including partial data D00, D01, D02, and D03. The node 12 has array data including partial data D10, D11, D12, and D13. The node 13 has array data including partial data D20, D21, D22, and D23. The node 14 has array data including partial data D30, D31, D32, and D33.

The nodes 11 and 12 exchange the partial data D00 to D03 and the partial data D10 to D13. Then, the nodes 11 and 12 execute a calculation using a function f to obtain partial data f(D00, D10), f(D01, D11), f(D02, D12), and f(D03, D13).

Similarly, the node 13 and the node 14 exchange the partial data D20 to D23 and the partial data D30 to D33. The nodes 13 and 14 execute a calculation using the function f to obtain partial data f(D20, D30), f(D21, D31), f(D22, D32), and f(D23, D33).

Next, the node 11 and the node 13 exchange the respective calculation results and execute the calculation using the function f. The node 12 and the node 14 exchange the respective calculation results and execute the calculation using the function f. As a result, all of the nodes 11 to 14 obtain f(D00, D10, D20, D30), f(D01, D11, D21, D31), f(D02, D12, D22, D32), and f(D03, D13, 023, D33). As a result, the nodes 11 to 14 complete the Allreduce processing.

As described above, the parallel computer according to the present modification example executes the Allreduce processing by using a method for all-nodes averaging processing using the two-group average that is different from that in Example 1. In this way, even when using the method for averaging all nodes using another group average, the throughput may be improved without sacrificing the calculation accuracy.

MODIFICATION EXAMPLE 2

In Example 1, the group aggregation processing execution unit 104 performs a calculation expressed by $(x0\ \&\ x1)+((x0\hat{\ }x1)\gg 1)$, which is a round-down method using rounding to negative infinity, thereby obtaining an average value of x0 and x1. However, the method for calculating the average value of the two nodes 10 while suppressing an overflow is not limited thereto. Therefore, calculation of the average value of the two nodes 10 by another method will be described below.

For example, the group aggregation processing execution unit 104 may obtain an average value of x0 and x1 by a rounding-up method using rounding to positive infinity. In this method, x0 and x1 are divided for each bit and an overestimated value of an average value is calculated, and then an error is subtracted. In this method, when the calculation of the overestimated value of the average value is "|", the group aggregation processing execution unit 104 obtains an average value of x0 and x1 by executing the calculation expressed as $(x0|x1)-((x0\hat{\ }x1)\gg 1)$.

When the bit values are the same in x0 and x1, since the bit values are the same, $(x0|x1)$ is a true average value that is not overestimated as it is. On the other hand, when the bit values are different between x0 and x1, different bits are extracted by $(x0\hat{\ }x1)\gg 1$. When the bit values are different, the true average value is expressed as $(x0\hat{\ }x1)-(x0\hat{\ }x\frac{1}{2})$. Therefore, when focusing on bits having different bit values, $(x0\hat{\ }x1)=(x0|x1)$. From this, the true average value when the bit values are different is calculated by $(x0|x1)-(x0\hat{\ }x\frac{1}{2})$. At this time, since rounding-down occurs at $(x0\hat{\ }x\frac{1}{2})$, the final average value is rounded up.

The group aggregation processing execution unit 104 may obtain an average value of x0 and x1 by using the rounding to the nearest even number. The rounding to the nearest even number is sometimes called Japanese Industrial Standards (JIS) rounding, International Organization for Standardization (IOS) rounding or bank rounding. This is a technique of rounding a fraction so that the result becomes an even number and aims to statistically reduce an accumulated error due to rounding of the fraction by one. Specifically, the group aggregation processing execution unit 104 calculates an average value by adding 1 when a fraction occurs and the rounding result becomes an odd number, based on the fraction rounding method of Example 1. That is, the group aggregation processing execution unit 104 calculates an average value of x0 and x1 by $t2+(t1\ \&\ t2\ \&\ 1)$, assuming $t1=(x0\hat{\ }x1)$ and $t2=(x0\ \&\ x1)+(t1\gg 1)$.

The average value of rounding down is $(x0\ \&\ x1)+((x0\hat{\ }x1)\gg 1)$. Since the fraction is generated by the calculation of $((x0\hat{\ }x1)\gg 1)$, it may be determined whether or not the fraction has occurred by looking at the least significant bit of $(x0\hat{\ }x1)$ before the shift. That is, by $((x0\hat{\ }x1)\ \&\ 1)$, a bit with a fraction may be extracted by looking at the least significant bit. Since it is possible to determine whether the rounding result is odd or not by the least significant bit of the rounding result, it is possible to extract bits with an odd rounding result by $(((x0\ \&\ x1)+((x0\hat{\ }x1)\gg 1))\ \&\ 1)$. From the above, whether or not a fraction occurs and the rounding result is an odd number may be determined by calculating the logical product of the above two items. That is, it is possible to extract bits having a fraction and having an odd rounding result by $(((x0\hat{\ }x1)\ \&\ ((x0\ \&\ x1)+((x0\hat{\ }x1)\gg 1))\ \&\ 1)$. By omitting the common calculation, a calculation for obtaining an average value of x0 and x1 using the above-described rounding to the nearest even number is generated.

As described above, the parallel computer according to the present modification example executes the Allreduce processing by using a method for calculating an average value of two values that is different from that in Example 1. Thus, even if a method different from Example 1 is used as a method for calculating an average value of two values, the throughput may be improved without sacrificing the calculation accuracy.

EXAMPLE 2

Figure 10:
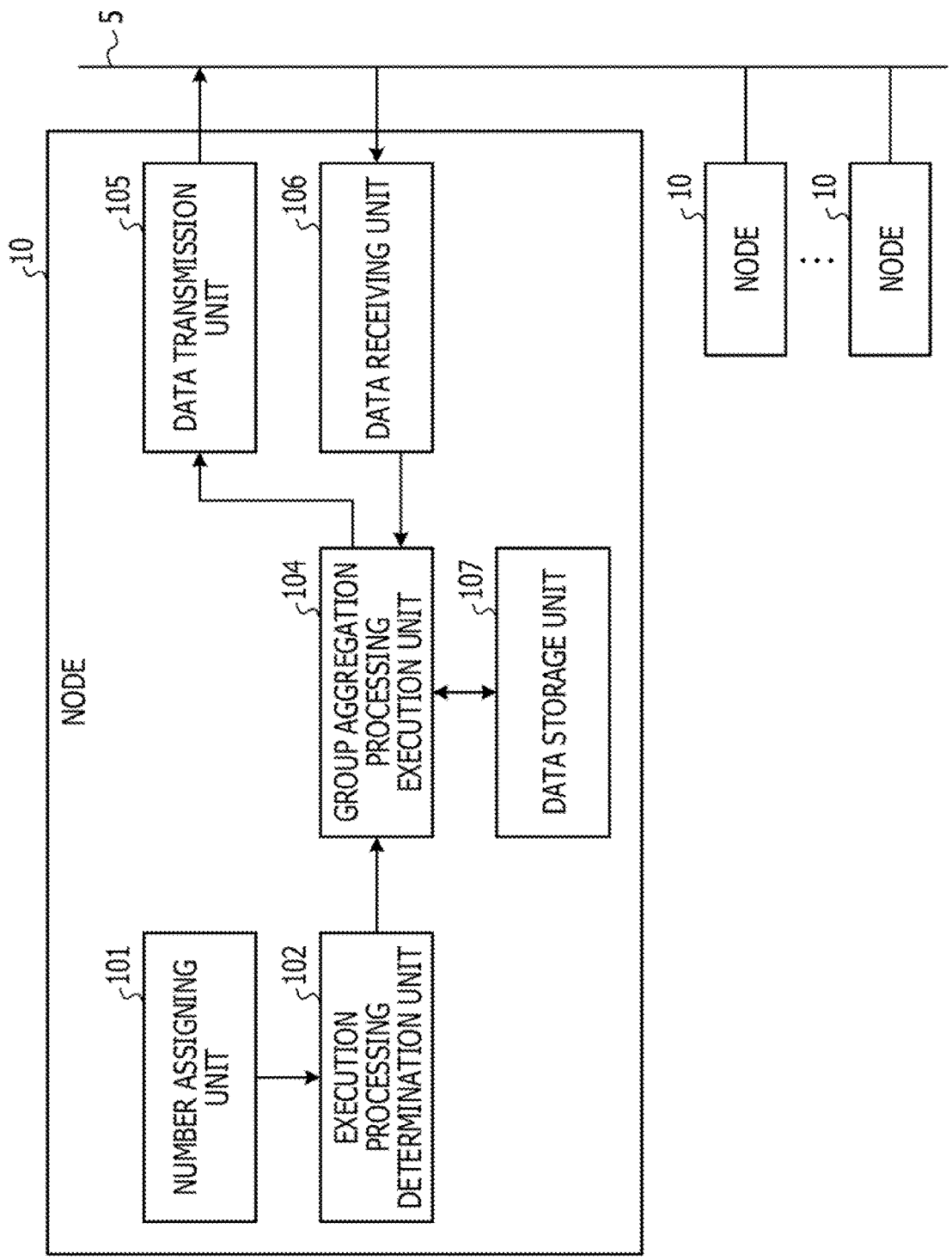
FIG. 10 is a block diagram of a node according to Example 2.

FIG. 10 is a block diagram of a node according to Example 2. The parallel computer 1 according to the present example is different from Example 1 in that the all-node averaging processing using the two-group average may be executed even when the number of objects to be the targets of Allreduce processing is not a power of 2. In the following description, description of functions of the same parts as those in Example 1 is omitted. Below, the number of targets of Allreduce processing is referred to as target number.

When the number of objects is a power of 2, the execution processing determination unit 102 requests the group aggregation processing execution unit 104 to execute the all-node averaging processing using the two-group average. On the other hand, when the number of objects is not a power of 2, the execution processing determination unit 102 requests the group aggregation processing execution unit 104 to execute the all-node averaging processing using the two-group average after adjusting the number of objects.

When the number of objects is not a power of 2, the group aggregation processing execution unit 104 receives a request to execute the all-node averaging process using the two-group average after adjusting the number of objects from the execution processing determination unit 102.

The group aggregation processing execution unit 104 determines whether or not the number of objects is less than the multiplier closest to the number of objects and is equal to or greater than a value obtained by subtracting the number obtained by reducing the multiplier by 2 from the number obtained by subtracting 1 from the multiplier of the number expressed by the power of 2. That is, when the number of objects is N and the multiplier closest to the number of objects is $2^P$, the group aggregation processing execution unit 104 determines whether $2^P+2^P-1 \leq N < 2^P$.

If the number of objects is greater than the multiplier closest to the number of objects, or less than a value obtained by subtracting the number obtained by reducing the multiplier by 2 from the number obtained by subtracting 1 from the multiplier of the number expressed by the power of 2, the group aggregation processing execution unit 104 determines that the number of objects is excessive with respect to the nearest power of 2.

When the number of objects is excessive, the group aggregation processing execution unit 104 randomly selects a node 10 having a power closest to the number of objects from all the targets of the all-node averaging processing using the two-group average. In this case, the group aggregation processing execution unit 104 performs random selection by using a random number type that is unified among the nodes 10 belonging to the communicator 2. As a result, each node 10 may unify the nodes 10 to be selected as the targets of the all-node averaging processing using the two-group average. Thereafter, the group aggregation processing execution unit 104 executes an all-node averaging process using the two-group average on the selected target as in Example 1.

On the other hand, if the number of objects is less than the multiplier closest to the number of objects, or is equal to or greater than a value obtained by subtracting the number obtained by reducing the multiplier by 2 from the number obtained by subtracting 1 from the multiplier of the number expressed by the power of 2, the group aggregation processing execution unit 104 determines that the number of objects is insufficient with respect to the nearest power of 2.

Figure 11:
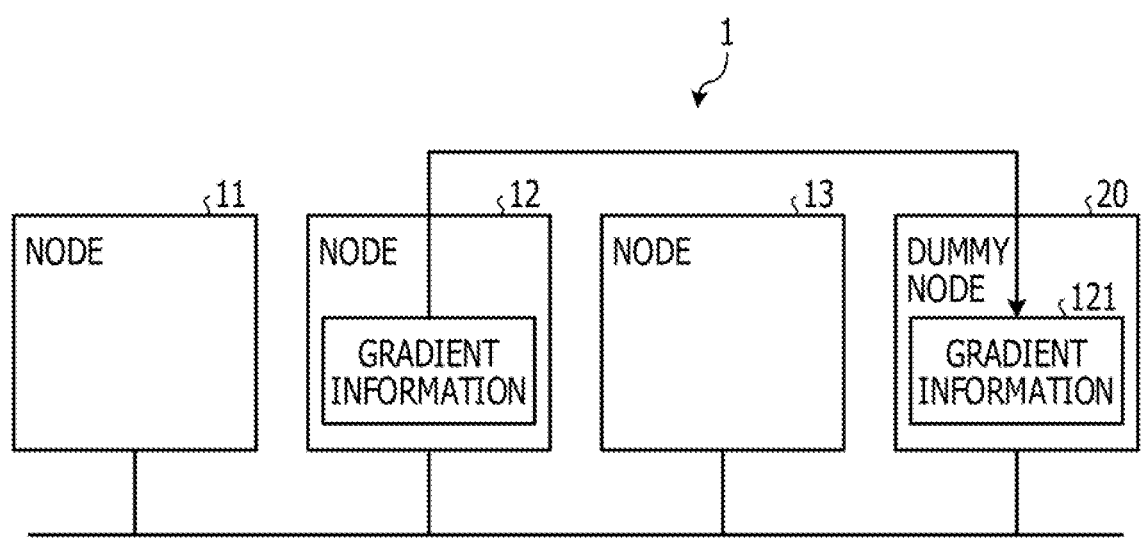
FIG. 11 is a diagram illustrating an outline of dummy node generation processing.

When the number is insufficient, the group aggregation processing execution unit 104 executes generation processing of a dummy node 20 illustrated in FIG. 11. FIG. 11 is a diagram illustrating an outline of dummy node generation processing. In the generation processing of the dummy node 20, the group aggregation processing execution unit 104 subtracts the number of objects from the number representing the number of objects as a power of 2 to obtain the number of additional dummy nodes 20. The group aggregation processing execution unit 104 generates a random number by using a random number type that is unified among the nodes 10 belonging to the communicator 2. The group aggregation processing execution unit 104 sets the node 10 corresponding to the generated random number as the node 10 that plays the role of the dummy node 20. The group aggregation processing execution unit 104 of each node 10 generates a random number by using a unified random number type, the node 10 that plays the role of the dummy node 20 may match any node 10 without querying other nodes 10. FIG. 11 illustrates a case where the node 12 is determined as the node 10 that plays the role of the dummy node 20.

The group aggregation processing execution unit 104 of the node 10 determined as the node 10 that plays the role of the dummy node 20 executes the operation as the dummy node 20 together with the original operation of the node 10. In FIG. 11, the node 12 and the dummy node 20 are described separately, but actually, the dummy node 20 is generated in the nodes 12. When the node 10 operates as the dummy node 20, for the gradient information, the gradient information held in the data storage unit 107 by the device is handled as the gradient information held by the dummy node 20.

The group aggregation processing execution unit 104 of the node 10 that plays the role of the dummy node 20 generates the dummy node 20 in the own device. At this time, the group aggregation processing execution unit 104 secures an area for storing the gradient information of the dummy node 20 in the data storage unit 107 and copies the gradient information to the area. That is, as an image after addition of the dummy node 20, the gradient information 121 of the node 12 is copied to the newly generated dummy node 20, as illustrated in FIG. 11.

Figure 12:
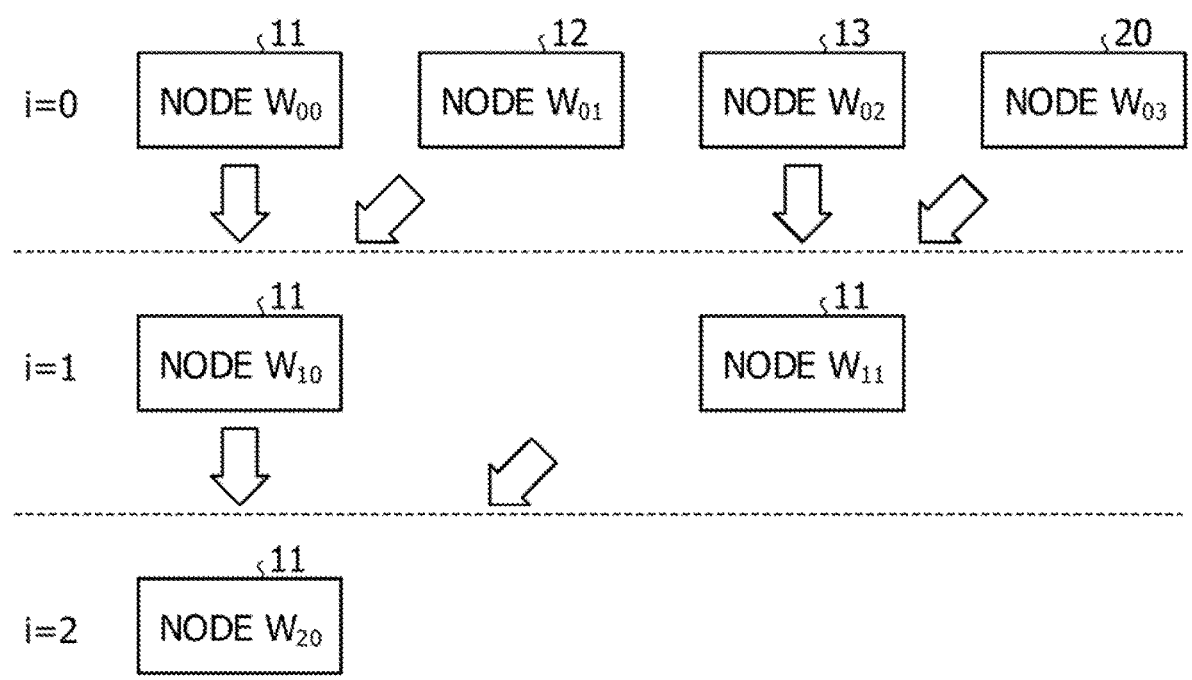
FIG. 12 is a diagram illustrating an example of gradient information aggregation processing according to Example 2.

The group aggregation processing execution unit 104 of the node 10 that plays the role of the dummy node 20 performs the averaging processing of the values retained by the two nodes 10 as the original nodes 10 and the averaging processing of the values retained by the two nodes 10 as the dummy nodes 20. The group aggregation processing execution unit 104 of the node 10 that does not play the role of the dummy node 20 executes the averaging processing of the values held by the two nodes 10 as in Example 1. As illustrated in FIG. 12, the node 10 repeats the averaging processing of the values held by the two nodes 10 until the number of the nodes 10 having the calculation result becomes one, and thereafter, distributing the calculation result to all the nodes 10 to complete the all-node averaging processing using the two-group average. FIG. 12 is a diagram illustrating an example of gradient information aggregation processing according to Example 2.

The dummy node 20 illustrated in FIG. 12 is actually a virtual node that operates on the node 12. In the averaging processing of the two nodes 10 at i=0, the dummy node 20 is processed as the node $W_{03}$. Thereafter, the processing is performed in the same manner as in Example 1, and the node 11 becomes the node $W_{02}$ having the average value of the gradient information of the nodes 11 to 13 and the dummy node 20.

Since one node 10 plays a role, the dummy node 20 is preferably excluded as soon as possible in the all-node averaging processing using the two-group average. Therefore, it is preferable that the group aggregation processing execution unit 104 generates a group in the node 10 and the dummy node 20 so as to exclude the dummy node 20 early.

Figure 13:
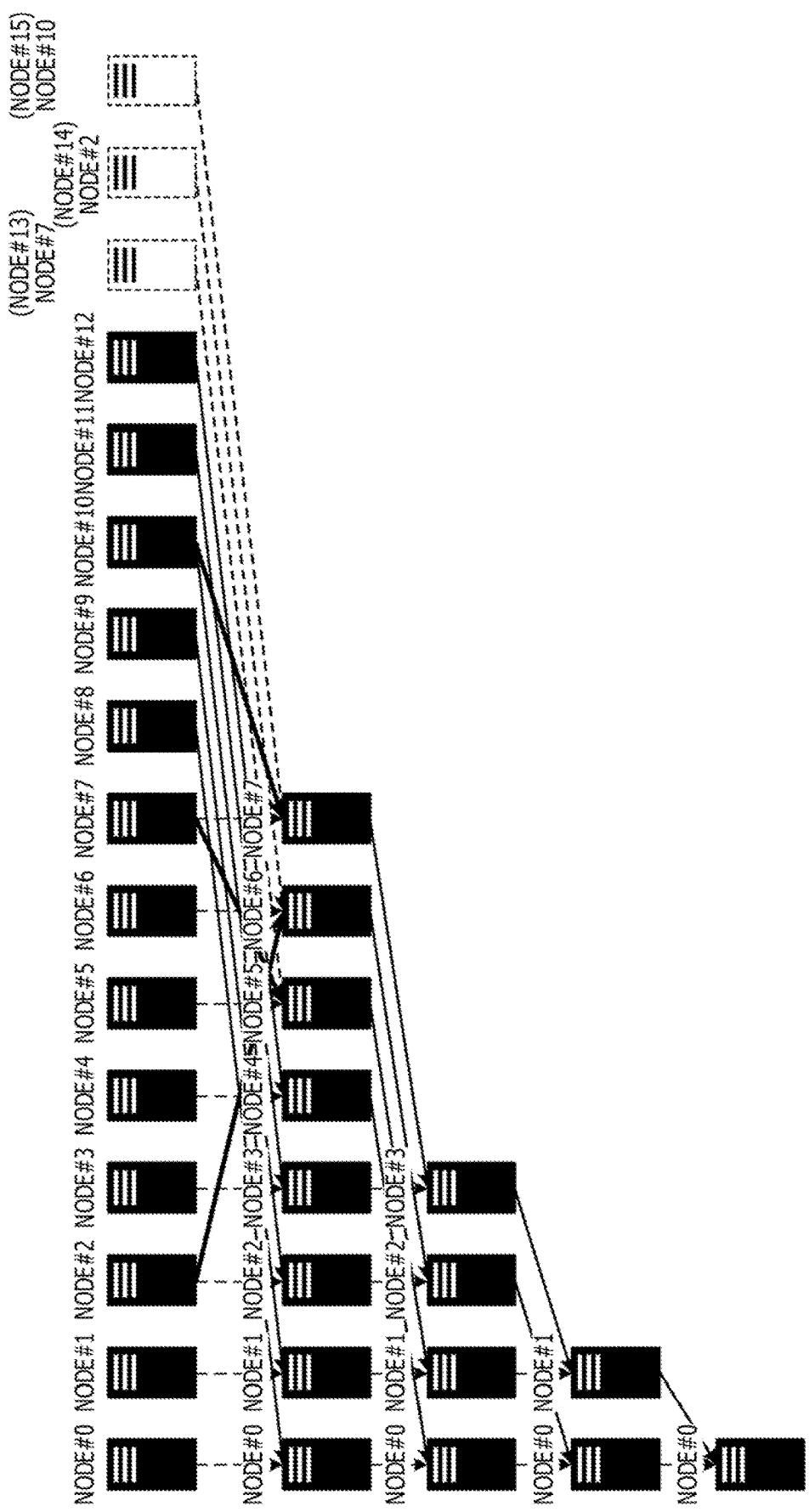
FIG. 13 is a diagram illustrating an example of a method for selecting a node set in the case of including a dummy node.
Figure 14:
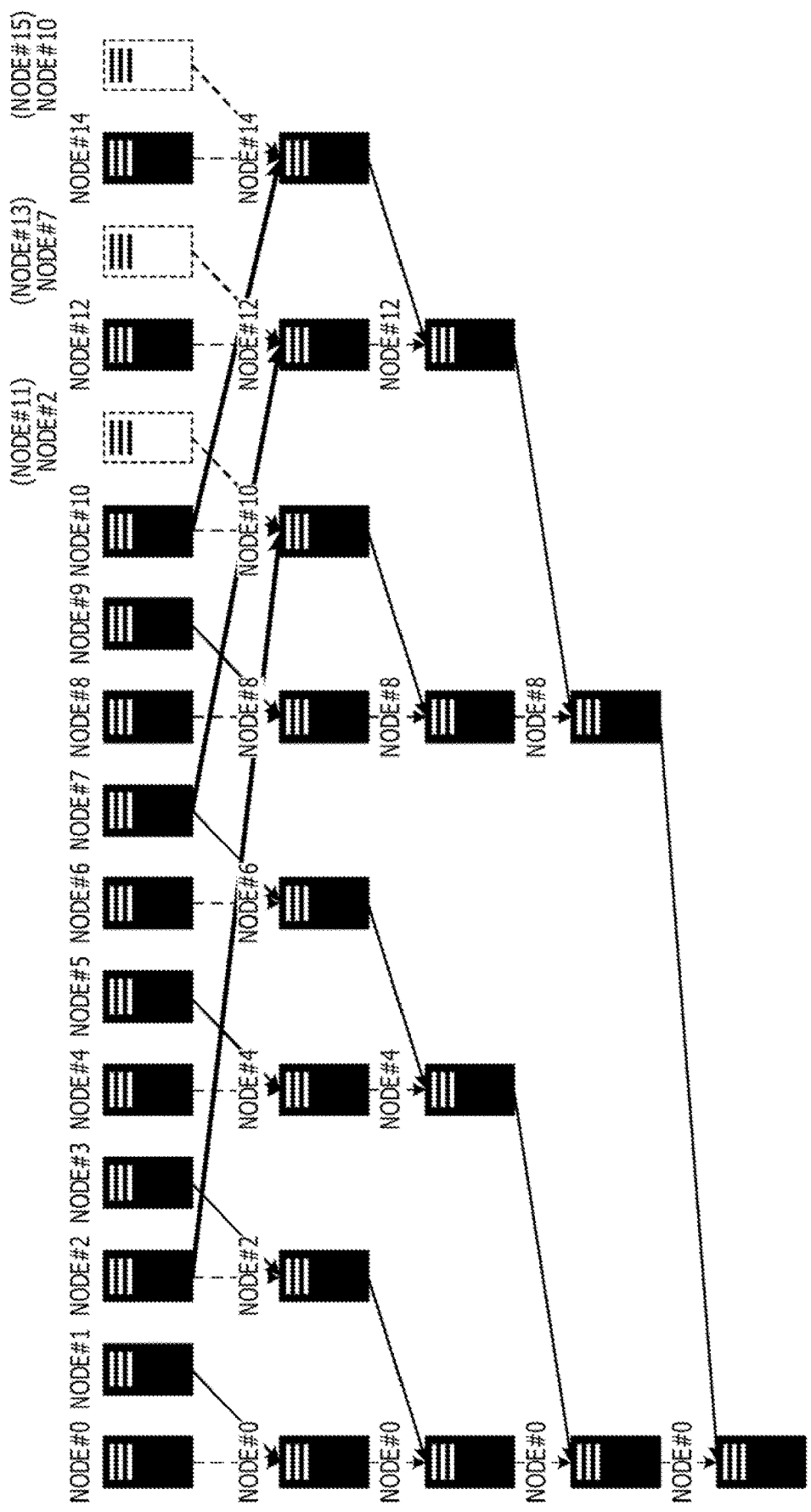
FIG. 14 is a diagram illustrating another example of a method for selecting a node set in the case of including a dummy node.

FIG. 13 is a diagram illustrating an example of a method for selecting a group of nodes when dummy nodes are included. FIG. 14 is a diagram illustrating another example of a method for selecting a group of nodes when dummy nodes are included. FIGS. 13 and 14 represents a case where there are 13 nodes 10 and three dummy nodes 20 are generated. For each averaging processing of the values of the two nodes 10, an assignment number is assigned to each node 10 having a calculation result from the lowest. #0 to #12 are assignment numbers, and each node 10 is represented by a value obtained by adding the assignment number to the node 10. The three dummy nodes 20 are represented as nodes #13 to #15, and a case will be described where each is executed by the nodes #7, #2 and #10.

For example, as illustrated in FIG. 13, when N is the number of objects and i is an integer greater than or equal to 0 and less than N/2, the group aggregation processing execution unit 104 configures a binary tree by assigning assignment numbers in order from the lowest rank, and grouping a node #i and the node #1+N/2. The group aggregation processing execution unit 104 of the node #i+N/2 transmits the retained data to the node #i that has become a group. On the other hand, the group aggregation processing execution unit 104 of the node #1 performs calculation by using the retained data of the own device and the received retained data. Thereafter, the group aggregation processing execution unit 104 repeats the reassignment of the allocation number and the averaging processing of the values of the two nodes 10. In this case, in first averaging processing of the values of the two nodes 10, the nodes #13 to #15 which are the dummy nodes 20 are excluded from the subsequent averaging processing of the values of the two nodes 10 thereafter.

For example, as illustrated in FIG. 14, the group aggregation processing execution unit 104 configures a binary tree by assigning assignment numbers in order from the lowest rank and grouping the node #i and the node #i+1 when i is an even number. The group aggregation processing execution unit 104 of the node #i+1 transmits the retained data to the node #i that has become a group. On the other hand, the group aggregation processing execution unit 104 of the node #i performs calculation by using the retained data of the own device and the received retained data. Thereafter, the group aggregation processing execution unit 104 repeats the reassignment of the allocation number and the averaging processing of the values of the two nodes 10. Also in this case, in the first averaging processing of the values of the two nodes 10, the nodes #13 to #15, which are the dummy nodes 20, transmit the retained data to the node 10 that is a group and are excluded from the subsequent averaging processing of the values of the two nodes 10.

Figure 15:
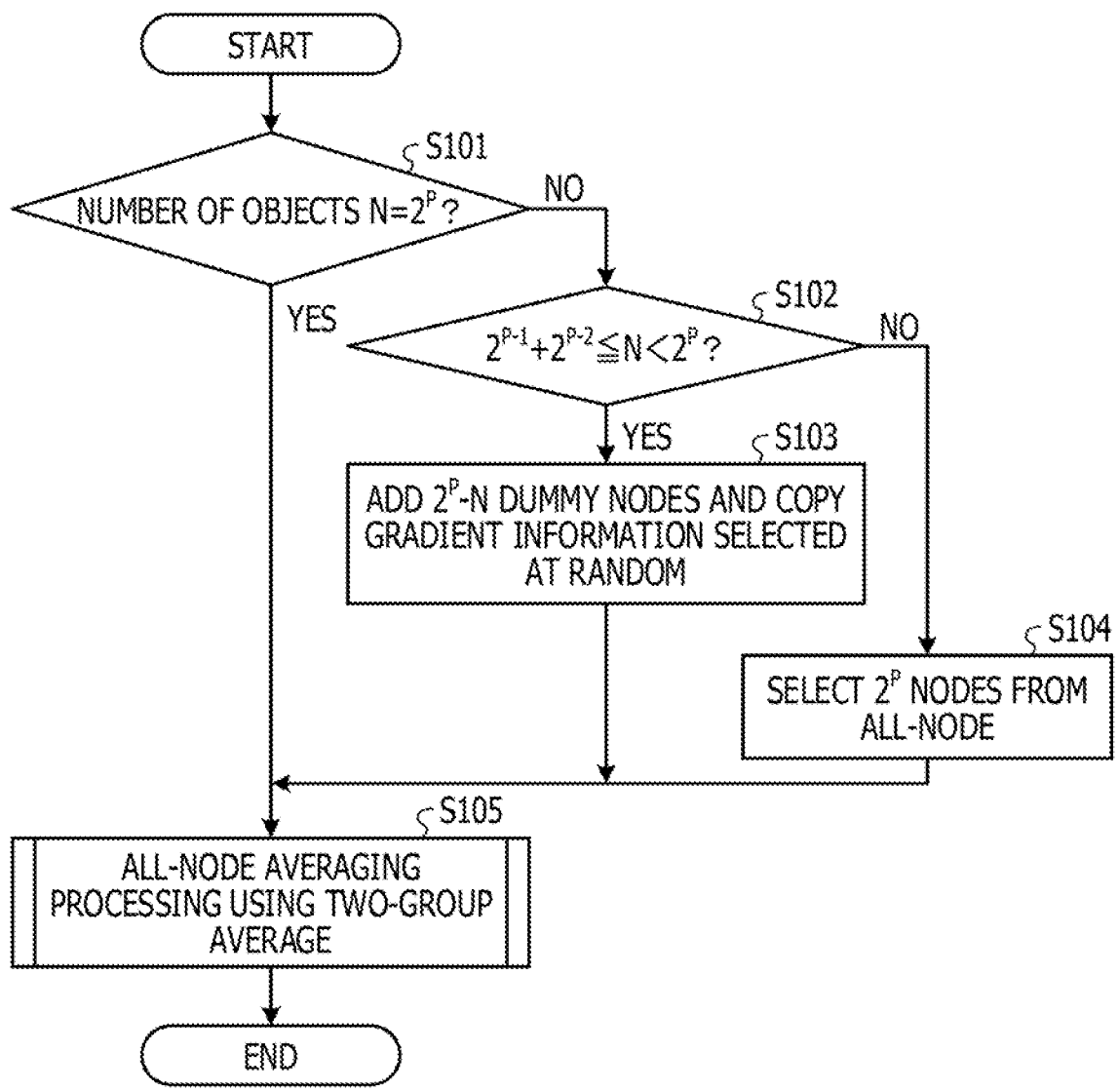
FIG. 15 is a flowchart of Allreduce processing by the parallel computer according to Example 2.

Next, with reference to FIG. 15, the flow of Allreduce processing by the parallel computer according to the present example will be described. FIG. 15 is a flowchart of Allreduce processing by the parallel computer according to Example 2.

The execution processing determination unit 102 receives input of the size information and rank information of the communicator 2 from the number assigning unit 101. The execution processing determination unit 102 sets the size of the communicator 2 to the number of objects that is the number of nodes 10 to be the targets in the Allreduce processing. The number of objects is N. The execution processing determination unit 102 determines whether or not the number of objects N may be expressed as 2 to the p-th power, that is, whether or not $N=2^P$ (step S101).

In the case of $N=2^P$ (step S101: Yes), the execution processing determination unit 102 requests the group aggregation processing execution unit 104 to perform the all-node averaging processing using the two-group average. In response to the request from the execution processing determination unit 102, the group aggregation processing execution unit 104 executes an all-node averaging processing using the two-group average (step S105). The processing executed in step S105 corresponds to, for example, steps S3 to S11 illustrated in the flowchart of FIG. 7.

If $N=2^P$ is not satisfied (No at Step S101), the execution processing determination unit 102 requests the group aggregation processing execution unit 104 to perform an all-node averaging processing using the two-group average after adjusting the number of objects. Therefore, in response to the request from the execution processing determination unit 102, the group aggregation processing execution unit 104 determines whether or not the number of objects is smaller than the multiplier closest to the number of objects and is equal to or greater than a value obtained by subtracting the number obtained by reducing the multiplier by 2 from the number obtained by reducing by subtracting 1 from the multiplier of the number expressed by the power of 2. That is, the group aggregation processing execution unit 104 determines whether or not $2^{P-1}+2^{P-2} \leq N < 2^P$ when the number of objects is N and the power of 2 closest to the number of objects is $2^P$ (step S102).

When $2^{P-1}+2^{P-2} \leq N < 2^P$ (step S102: Yes), the group aggregation processing execution unit 104 adds $2^P$-N dummy nodes 20 and copies the gradient information selected at random (step S103). In other words, the group aggregation processing execution unit 104 generates the dummy node 20 in the randomly selected node 10, copies the gradient information retained by the selected node 10, and causes the dummy node 20 to retain the gradient information.

Thereafter, the group aggregation processing execution unit 104 executes the all-node averaging processing using the two-group average, with the dummy node 20 and the node 10 as the targets of the all-node average processing using the two-group average (step S105).

On the other hand, when $2^{P-1}+2^{P-2} \leq N < 2^P$ is not satisfied (step S102: negative), the group aggregation processing execution unit 104 randomly selects $2^P$ nodes 10 from the N nodes 10 that are targets of the all-node averaging processing using the two-group average (step S104).

Thereafter, the group aggregation processing execution unit 104 executes the all-node averaging processing using the two-group average with the selected nodes 10 as the targets of the all-node averaging processing using the two-group average (step S105).

Figure 16:
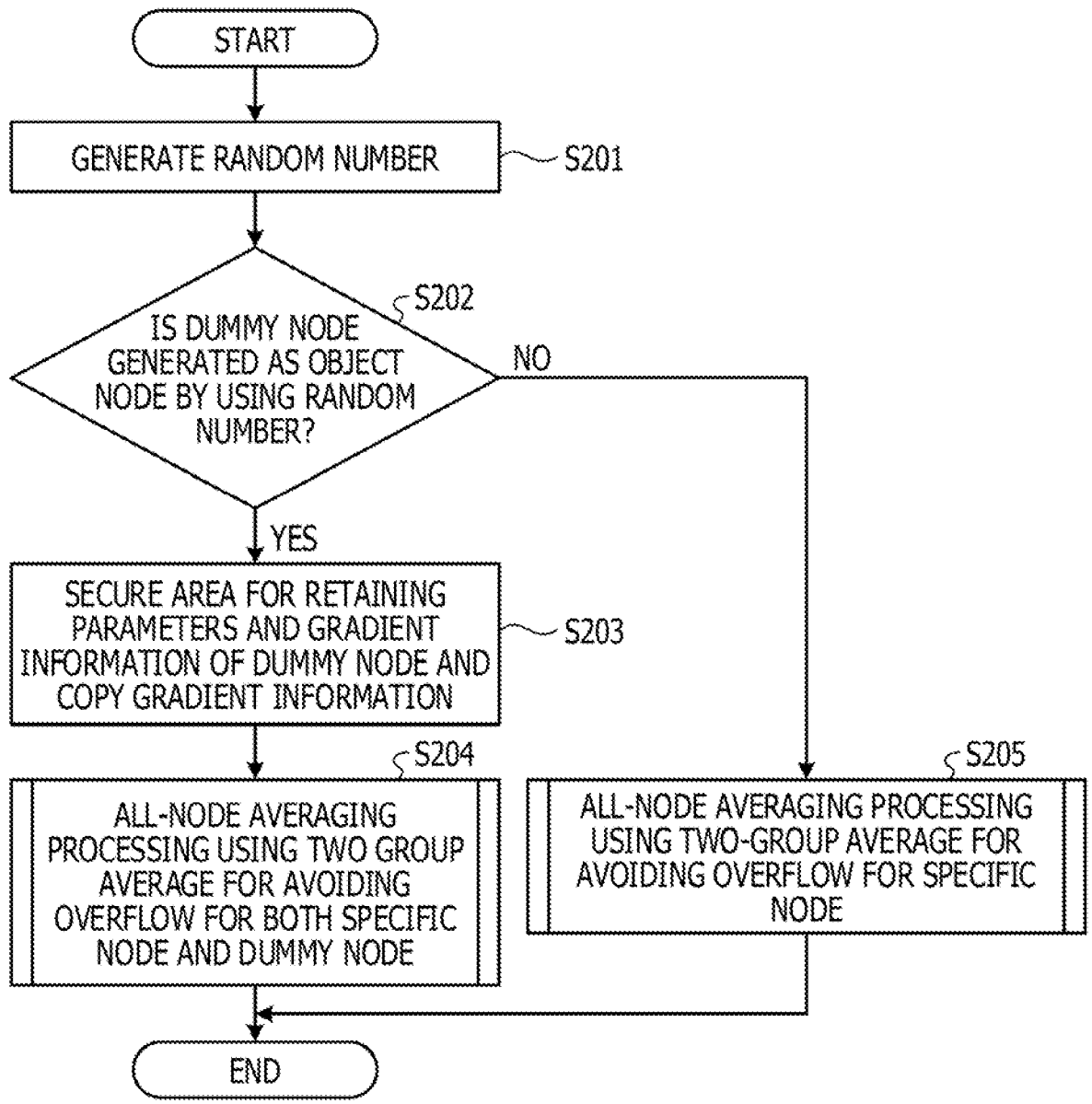
FIG. 16 is a flowchart of all-nodes averaging processing using an average of two sets at each node.

With reference to FIG. 16, the flow of the all-node averaging processing using the two-group average in the specific node 10 will be described. FIG. 16 is a flowchart of the all-node averaging processing using the two-group average in each node.

The group aggregation processing execution unit 104 generates a random number from the unified random number type (step S201).

The group aggregation processing execution unit 104 determines whether or not the specific node 10 that is the own device is the node 10 that generates the dummy node 20 by using the generated random number (step S202).

When the specific node 10 is the node 10 that generates the dummy node 20 (step S202: Yes), the group aggregation processing execution unit 104 secures an area for retaining the parameters and gradient information of the dummy node 20. The group aggregation processing execution unit 104 copies the gradient information to the secured area (step S203).

The group aggregation processing execution unit 104 executes an all-node averaging processing using the two-group average for avoiding an overflow for both the specific node 10 and the dummy node 20 (step S204).

On the other hand, when the specific node 10 is not the node 10 that generates the dummy node 20 (step S202: No), the group aggregation processing execution unit 104 executes the all-node averaging processing using the two-group average for avoiding an overflow for the specific node 10 (step S205).

As described above, the parallel computer according to the present example reduces the number of objects by selecting from the total number of objects according to the number of objects, or increases the number of objects by adding dummy nodes and executes the all-node averaging processing using the two-group average. As a result, even when the number of objects may not be expressed by a power of 2, it is possible to execute the all-node averaging processing using the two-group average. Therefore, the parallel computer according to the present example may reduce calculation errors and suppress the data transfer amount and may improve the throughput without limiting the number of objects and sacrificing the calculation accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a first information processing device that transmits first data to be retained via a communication path;
a second information processing device that calculates first calculation result data that is a calculation result of the first data received via the communication path and second data to be retained and transmits the calculated first calculation result data via the communication path;
a third information processing device that transmits third data to be retained via the communication path; and
a fourth information processing device that calculates second calculation result data that is a calculation result of the third data received via the communication path and fourth data to be retained and calculates third calculation result data that is a calculation result of the first calculation result data received via the communication path and the calculated second calculation result data,
the first to fourth data are first to fourth numerical data, respectively,
the first calculation result data is an addition result of first logical product result data that is a calculation result of logical product of the first numerical data and the second numerical data, and first shift result data obtained by shifting first exclusive OR result data that is a calculation result of exclusive OR of the first numerical data and the second numerical data by 1 bit to the right,
the second calculation result data is an addition result of second logical product result data that is a calculation result of logical product of the third numerical data and the fourth numerical data, and second shift result data obtained by shifting second exclusive OR result data that is a calculation result of exclusive OR of the third numerical data and the fourth numerical data by 1 bit to the right, and
the third calculation result data is an addition result of third logical product result data that is a calculation result of logical product of the first calculation result data and the second calculation result data, and third shift result data obtained by shifting third exclusive OR result data that is a calculation result of exclusive OR of the first calculation result data and the second calculation result data by 1 bit to the right.

2. The information processing system according to claim 1,
wherein the first to fourth data are first to fourth numerical data, respectively,
the first calculation result data is an average of the first numerical data and the second numerical data,
the second calculation result data is an average of the third numerical data and the fourth numerical data, and
the third calculation result data is an average of the first calculation result data and the second calculation result data.

3. The information processing system according to claim 1, wherein the first to third information processing devices acquire the third calculation result data calculated by the fourth information processing device.

4. The information processing system according to claim 1, wherein, in a case where any specific information processing device among the first to fourth information processing devices does not exist, any one of the information processing devices other than the specific information processing device generates the specific information processing device virtually.

5. The information processing system according to claim 1, wherein, in a case where there is a fifth information processing device in addition to the first to fourth information processing devices, the first to fourth information processing devices are selected.

6. A control method of an information processing system in which first to fourth information processing devices are coupled via a communication path, the method comprising:
transmitting first data to be retained via the communication path by the first information processing device;
calculating first calculation result data that is a calculation result of the first data received via the communication path and second data to be retained and transmitting the calculated first calculation result data via the communication path by the second information processing device;
transmitting third data to be retained via the communication path by the third information processing device; and
calculating second calculation result data that is a calculation result of the third data received via the communication path and fourth data to be retained and calculating third calculation result data that is a calculation result of the first calculation result data received via the communication path and the calculated second calculation result data by the fourth information processing device,
the first to fourth data are first to fourth numerical data, respectively,
the first calculation result data is an addition result of first logical product result data that is a calculation result of logical product of the first numerical data and the second numerical data, and first shift result data obtained by shifting first exclusive OR result data that is a calculation result of exclusive OR of the first numerical data and the second numerical data by 1 bit to the right,
the second calculation result data is an addition result of second logical product result data that is a calculation result of logical product of the third numerical data and the fourth numerical data, and second shift result data obtained by shifting second exclusive OR result data that is a calculation result of exclusive OR of the third numerical data and the fourth numerical data by 1 bit to the right, and
the third calculation result data is an addition result of third logical product result data that is a calculation result of logical product of the first calculation result data and the second calculation result data, and third shift result data obtained by shifting third exclusive OR result data that is a calculation result of exclusive OR of the first calculation result data and the second calculation result data by 1 bit to the right.

* * * * *